(12) United States Patent
Davison et al.

(10) Patent No.: US 11,584,678 B2
(45) Date of Patent: Feb. 21, 2023

(54) METHODS OF PRODUCTION OF OIL AND GAS SERVICE PLUGS

(71) Applicant: TALLY PRODUCTION SYSTEMS, LLC, Houston, TX (US)

(72) Inventors: Douglas Wayne Davison, Houston, TX (US); Shane Allen Davison, Houston, TX (US)

(73) Assignee: TALLY PRODUCTION SYSTEMS, LLC, Houston, TX (US)

( * ) Notice: Subject to any disclaimer, the term of this patent is extended or adjusted under 35 U.S.C. 154(b) by 438 days.

(21) Appl. No.: 16/880,781

(22) Filed: May 21, 2020

(65) Prior Publication Data

US 2020/0369552 A1 Nov. 26, 2020

Related U.S. Application Data

(60) Provisional application No. 62/850,620, filed on May 21, 2019.

(51) Int. Cl.
*C03B 37/012* (2006.01)
*E21B 33/12* (2006.01)
*E21B 33/13* (2006.01)
*B29C 70/68* (2006.01)
*E21B 43/26* (2006.01)

(52) U.S. Cl.
CPC ........ *C03B 37/01205* (2013.01); *B29C 70/68* (2013.01); *E21B 33/1204* (2013.01); *E21B 33/13* (2013.01); *E21B 43/26* (2013.01)

(58) Field of Classification Search
CPC ... C03B 37/01205; B29C 70/68; B29C 70/32; E21B 33/1204; E21B 33/13; E21B 43/26; E21B 33/1208; E21B 33/12
See application file for complete search history.

(56) References Cited

U.S. PATENT DOCUMENTS

| | | |
|---|---|---|
| 2017/0306718 A1 | 10/2017 | Tse et al. |
| 2018/0297351 A1 | 10/2018 | Welch |
| 2019/0226298 A1 | 7/2019 | Coon |
| 2019/0292874 A1 | 9/2019 | Saeed |
| 2019/0316434 A1 * | 10/2019 | Davies ................. E21B 33/134 |

* cited by examiner

*Primary Examiner* — Lee A Holly
(74) *Attorney, Agent, or Firm* — Park, Vaughan, Fleming & Dowler LLP (57) ABSTRACT

A method of production of a frac plug is disclosed comprising providing a blank defining an interior of the frac plug, placing a glass material around the blank such that a fiber reinforcement within the glass material is off axis to a longitudinal axis of the frac plug and wherein the placing forms a glass material blank, removing the blank from the glass material blank and performing at least one mechanical processing of an exterior of the glass material blank.

21 Claims, 5 Drawing Sheets

FIG. 5

METHODS OF PRODUCTION OF OIL AND GAS SERVICE PLUGS

CROSS REFERENCE TO RELATED APPLICATIONS

The present application claims priority to U.S. Provisional Application 62/850,620 filed May 21, 2019, the entirety of which is incorporated by reference.

STATEMENT REGARDING FEDERALLY SPONSORED RESEARCH OR DEVELOPMENT

None.

FIELD OF THE DISCLOSURE

Aspects of the disclosure relate to oil and gas processing. More specifically, aspects of the disclosure relate to production methods for plugs used in oil and gas services.

BACKGROUND INFORMATION

Production of oil and gas from geological stratum can involve different tools that are used by operators. Of recent significance, a process known as fracturing ("fracking") uses devices that may be placed within the stratum to create an increase in pressure. The increase in pressure can exceed the yield point of the soils and rock within the stratum, thereby fracturing the stratum. Oil and gas that may be under pressure may leak into the fractures and then ultimately may be collected by the operator.

As will be understood, different sections of stratum may have different geological features. One stratum may be rich in petroleum, while others may contain only hard rock. It is desired to place the stratum that is rich in petroleum under pressure to allow for fracturing, while the other rock bearing stratum remain untouched. Thus, different zones of stratum may be delineated within the underground for further processing.

To aid in the segregation of the underground, different zones may be established through a series of plugs ("frac plugs") that are placed within a wellbore drilled within the stratum. These frac plugs can prevent the flow of fluids from one side of the installed plug to the other. For an operator, a plug may be placed within a wellbore that extends through the stratum at an elevation directly under the bottom of a petroleum rich zone. Fluids (often a mixture of water, sand, and chemicals) are then pumped down the wellbore, and the wellbore is charged ("pressurized") up to a level where the stratum in the petroleum rich zone is fractured. The operator can then remove the plug through various means, such as through drilling or mechanical disengagement from the wellbore.

Frac plugs, due to their need to withstand high mechanical forces, are made of durable metal materials that are expected to be encountered within the high pressurized environment. Conventional frac plugs are metallic units that have gripping features on the exterior of the plug to allow them to be wedged into place to limit fluid flow. These conventional frac plugs are expensive to produce due to the number of parts of the frac plug. Moreover, conventional frac plugs are made of metallic materials that are difficult to remove or drill through for removal.

There is a need to provide a frac plug that is more cost effective to produce than conventional metal frac plugs.

There is a further need to provide a frac plug that may be removed from the wellbore in a cost effective manner.

There is a further need to provide a frac plug that is generally light weight for ease of handling by the operators, but is also durable for expected loads.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method of production of a frac plug is disclosed comprising providing a blank defining an interior of the frac plug, placing a glass material around the blank such that a fiber reinforcement within the glass material is off axis to a longitudinal axis of the frac plug and wherein the placing forms a glass material blank, removing the blank from the glass material blank; and performing at least one mechanical processing of an exterior of the glass material blank.

In another non-limiting embodiment, a method of production of a frac plug is disclosed comprising providing a blank defining an interior of the frac plug, placing a glass material around the blank such that a fiber reinforcement within the glass material is off axis to a longitudinal axis of the frac plug and wherein the placing forms a glass material blank, placing a solution onto the placed glass material to produce a reaction between the glass material blank and the solution forming a resultant blank, removing the blank from the resultant blank, curing the resultant blank and performing at least one mechanical processing of an exterior of the resultant blank.

In another non-limiting embodiment, a method of production of a frac plug is disclosed comprising providing a blank defining an interior of the frac plug, placing a material around the blank such that a fiber reinforcement within the material is off axis to a longitudinal axis of the frac plug and wherein the placing forms a glass material blank and wherein the glass material has a resin pre added, placing a solution onto the placed glass material to produce a reaction with the glass material and the resin, removing the blank from the glass material blank, curing the glass material blank and performing at least one mechanical processing of an exterior of the glass material blank.

In one non-limiting embodiment, a method of production of a frac plug is provided, comprising providing a mold defining an interior of the frac plug, placing a glass material around the mold such that a fiber reinforcement within the glass material is off axis to a longitudinal axis of the frac plug and wherein the placing forms a glass material blank, removing the mold from the glass material blank, and performing at least one mechanical processing of an exterior of the glass material blank.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In non-limiting embodiments, a method of making a frac plug used in oil and gas operations is disclosed. In embodiments, a substrate with glass reinforcing fibers is used as the main material component. Placement of the substrate and manufacturing is performed such that the reinforcing fibers are located such that a plane of sheer for expected loading along the axis of the plug is not parallel to the axial length of the reinforcing fibers. By placing the reinforcing fibers at an angle to the plane of axis of the plug, the reinforcing fibers may take loads without a delamination of individual fiber sections of the frac plug.

During a typical fracking process, a frac plug is set by a setting tool and the well bore casing is perforated for a distance above the frac plug. A frac ball (e.g., a ball made of non-porous material) is dropped into the frac plug and seated against a ball seat to act as a check valve to seal a section or sections below the frac plug. Next, the perforated section is perforated or fractured by pressurized fracking fluid. After this, another frac plug may be set above the first perforated section to isolate the entire section. This process may be repeated, as necessary.

Figure 1:
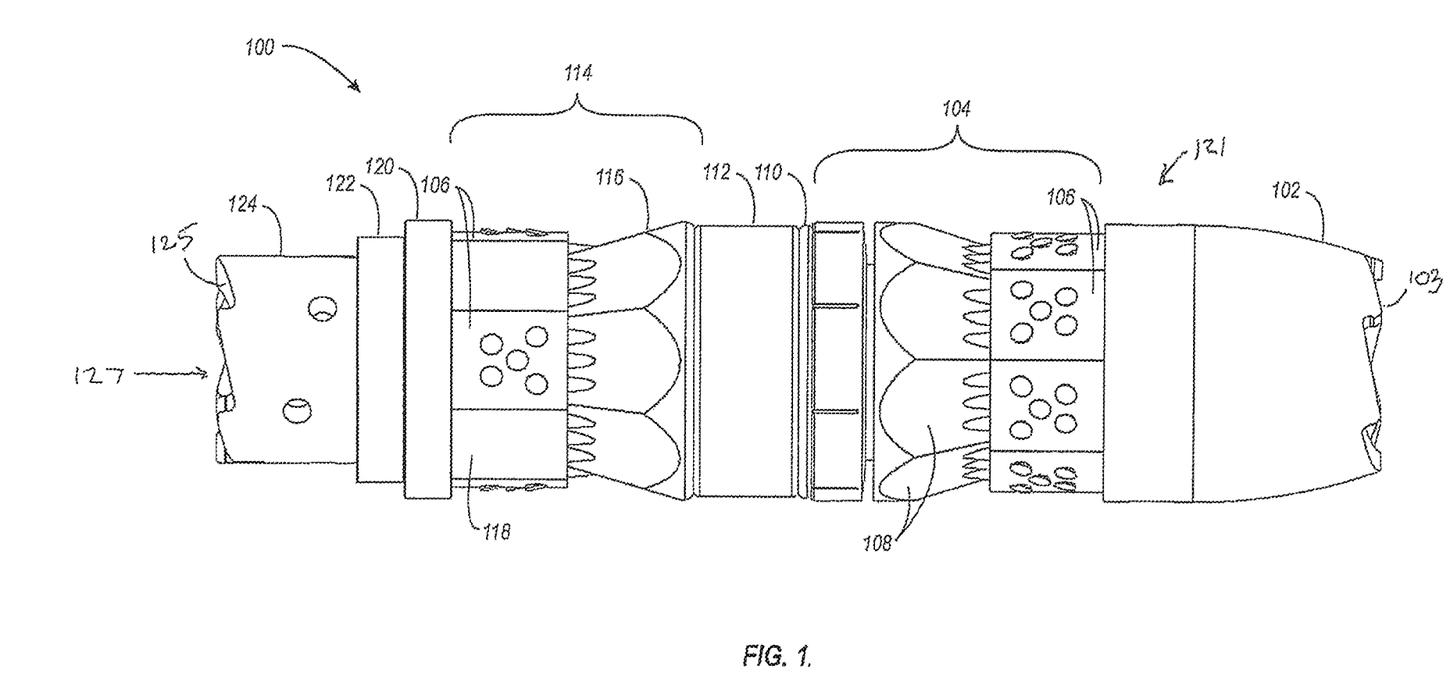
FIG. 1 is a side view of a frac plug apparatus in accordance with one example embodiment of the disclosure.

Referring to FIG. 1, a frac plug 100 is described as a two part system with a mandrel 124 that fits within a body 121. The body 121 comprises several different sections, each discussed below. Located at the bottom of the frac plug 100 is a shoe 102. As illustrated, the shoe 102 may have an exterior bottom surface that has a gripping surface 103. Adjacent to the shoe 102, a lower anchor slip assembly 104 is positioned to allow for gripping action between the frac plug 100 and the wellbore. The lower anchor slip assembly 104 may be configured with a set of self-guiding anchor slips 106 adjacent to a set of lower wedges 108. Above the lower anchor slip assembly 104 is a lower element 110 that can act as an additional sealing element. The lower element 110, for example, may be a rubber sealing ring, as a non-limiting embodiment.

Above the lower element 110, an upper element 112 connects both lower element 110 to an upper slip assembly 114. The upper slip assembly 114 has an upper wedge 116 section and anchor slips 106, 118. A load ring 120 with load ring wedge 122 is positioned above the anchor slips 106, 118 and functions to accept loads on the plug 100 during placement and setting. A mandrel 124 with connection face 125 is positioned such that a setting tool may connect with the connection face 125 for activation of the mandrel to move the mandrel 124 along an axis 127 of the frac plug 100. In the illustrated embodiment, the load ring 120 is formed with the remainder of the body 121.

In a typical setting of a frac plug 100, the frac plug 100 is a single use arrangement. The frac plug 100, once set, is removed by drilling on the upper connection face 125, thereby destroying the frac plug 100. If during the drilling process, the frac plug 100 happens to slip and move down the wellbore with the drill, the gripping surface 103 located on the shoe 102 may grip a connection face 125 of a subsequent lower plug, allowing the originally encountered frac plug 100 to be drilled as the lower plug will prevent further rotation.

Figure 5:
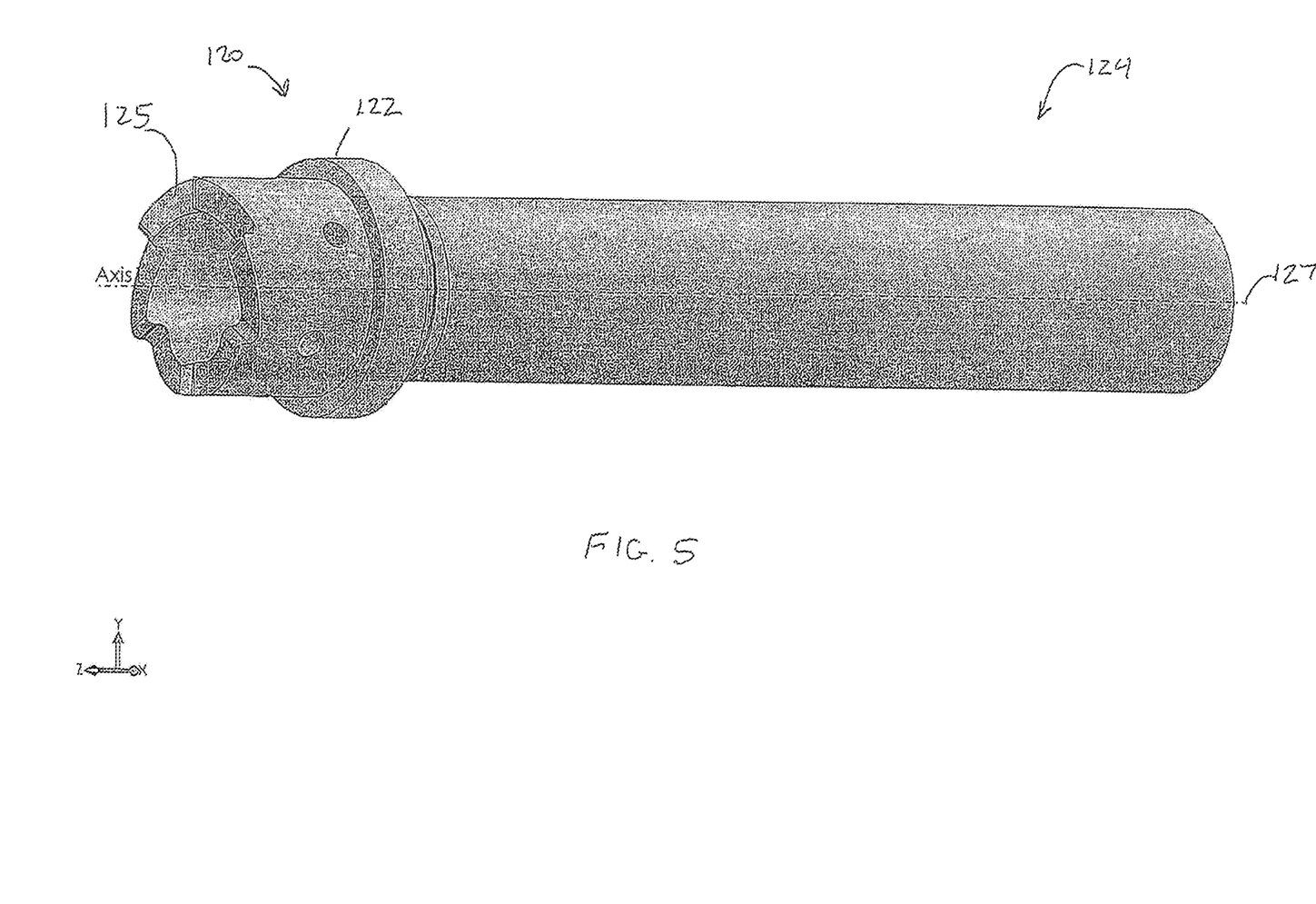
FIG. 5 is a side view of the frac plug mandrel.

In the embodiments disclosed, the frac plug 100 is made of a material, such as a plastic with embedded glass fibers. A non-limiting example embodiment may include, for example, type A glass, type C glass, type E glass, type AD glass, and type S glass. Different widths and weight of glass may be used. Weave thickness for the embedded glass fibers, such as 0.0058" or 0.0089", may be used. During fabrication, heating or cooling of the substrate and glass fibers may occur in order to shape the glass into the desired shape as provided in FIG. 1. Referring to FIG. 5, the mandrel 124 is illustrated removed from the remainder of the body 121.

Figure 2:
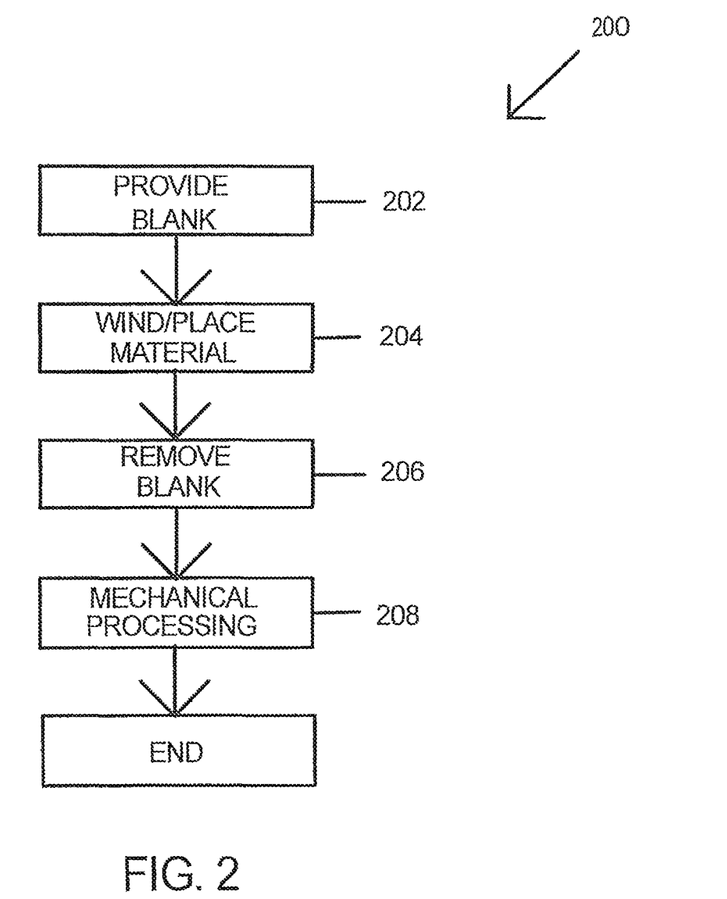
FIG. 2 is a method of manufacturing the frac plug apparatus of FIG. 1.

As illustrated in FIG. 1, a single blank of material is formed by laying a continuous layer of glass reinforcing fiber material over a blank that provides the desired internal structure. In the illustrated embodiment, the blank may be a specified shape or a "shaped blank" that will define the interior of the material placed around the shaped blank. Referring to FIG. 2, a method 200 of production of the frac plug 100 of FIG. 1 is illustrated. In 202, a blank is provided that defines the desired interior structure. In 204, a material with interior glass fibers is wound around the blank at an angle compared to the longitudinal axis of the frac plug 100, thus forming a glass material blank. In one non-limiting embodiment, the angle may be 25 degrees. It will be understood that greater or lesser angles may be used as long as a fiber reinforcement length is not in a same plane as the longitudinal axis. In some embodiments, two different reinforcement directions are not in the same plane as the longitudinal axis. Wrapping continues until the blank is covered to a desired thickness level. In 206, the blank is removed from an interior of the glass material blank. In 208, at least one mechanical processing is performed on an exterior of the glass material blank. In the method 200 provided in FIG. 2, a glass fiber material in a strip may be used. The glass fiber material may have an incorporated plastic pre-mixed within the strip, as a non-limiting embodiment.

Figure 3:
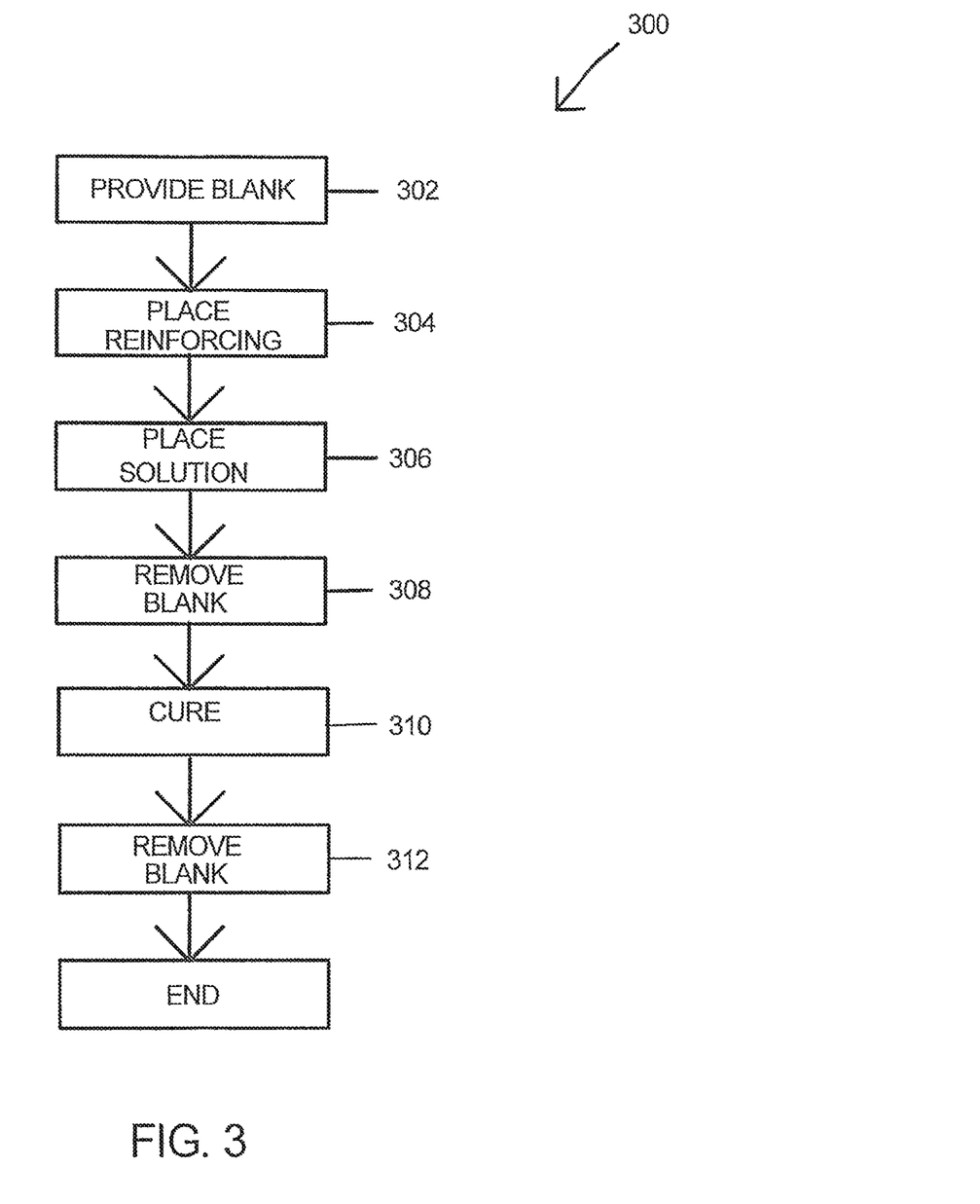
FIG. 3 is a second method of manufacturing the frac plug apparatus of FIG. 1.

Referring to FIG. 3, a second example embodiment of a method 300 for producing a frac plug is illustrated. The method starts at 302 by providing a blank defining an interior of a frac plug to be made. At 304, the method continues by placing a glass fiber reinforcing material around the blank such that a fiber reinforcement is off axis to a longitudinal axis of the frac plug and wherein the placing forms a glass material blank. At 306, the method further continues by placing a solution onto the placed glass material to produce a reaction between the glass material blank and the solution forming a resultant blank. At 308, the method continues by removing the blank from the resultant blank. At 310, the method further continues by curing the resultant blank. At 312, at least one mechanical processing is performed on an exterior of the resultant blank.

The solution placed in 306 may be a resin, alcohol, water and/or a hardener to help in curing the glass material blank. Different resins may be used according to the needs of the project, wherein a fast setting resin and hardener may be used in rapid production or prototyping applications. In this embodiment, as well as the others described, the placed glass material may be in a strip form and may include or may not include a resin. As will be understood, a resin, alcohol, and/or hardener mixture may be added separately to the placed glass. Such additions may be by dipping, spraying, coating or brushing techniques. The glass cloth may have one, two or three axes of reinforcement as non-limiting embodiments. Mechanical processing in this and the other embodiments disclosed may include drilling of holes, mechanical abrasion techniques and filling of defects or areas of the frac plug to achieve a desired profile.

Figure 4:
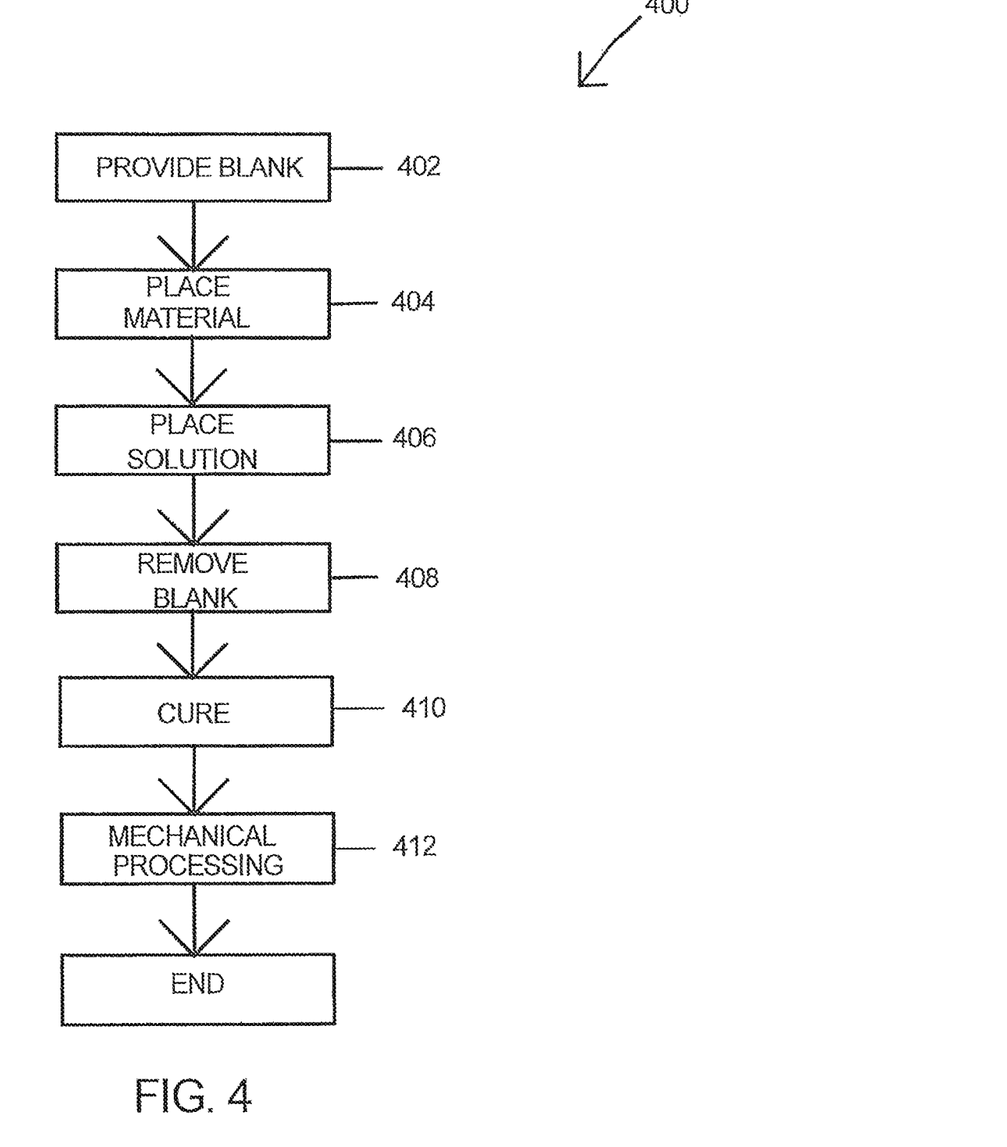
FIG. 4 is a third method of manufacturing the frac plug apparatus of FIG. 1.

Referring to FIG. 4, another method 400 of production of a frac plug is illustrated. A blank is provided that defines an interior of the frac plug at 402. At 404, a material is placed around the blank such that a fiber reinforcement within the material is off axis to a longitudinal axis of the frac plug, wherein the placing forms a glass material blank, and wherein the glass material has a resin pre added. At 406, a solution is placed onto the placed glass material to produce a reaction with the glass material and the resin. At 408, the blank is removed from the glass material blank. At 410, the glass material blank is cured. At 412, at least one mechanical processing is performed at an exterior of the glass material blank.

In all of the embodiments disclosed, the placing of the glass fiber reinforcement may include winding, manual placement of sheets, blowing of fibers as well as other methods. The use of the term placing, therefore, should not be considered limiting in scope.

In the cases where heating of the glass occurs and a matrix is established, it may be necessary to remove heat from the glass material blank. In a non-limiting embodiment, a fluid may be conducted through the center of the blank (which may be hollow) so heat is removed by the flowing fluid. Compressed air, water or anti-freeze solutions may be used according to the amount of cooling needed for proper cooling. Such cooling may occur through the placing/winding process or may occur once all of the wrapping process has been completed. As complex geometries are not generally possible with glass wrapping processes, mechanical processing is then conducted to achieve the desired exterior profile.

In some embodiments, the mandrel 124 may be separately manufactured from the remainder of the frac plug 100. To this end, construction of the mandrel 124 and the remainder of the frac plug 100 can be conducted simultaneously, thereby increasing speed of manufacture.

As will be understood, the use of a blank for forming the features of the glass material blank may be achieved through the use of a mold. Either the blank or the mold may be heated during the fabrication or pre-heated during the fabrication to allow for proper viscosity of fluids used during the fabrication process. In other embodiments, multiple components may be fabricated during the same process, thereby speeding the overall construction.

In some embodiments, placement of the reinforcing fibers for the glass material blank is performed wherein care is taken that the reinforcing fibers do not run parallel to expected lines of force traveling down the axial length of the frac plug 100. Fibers may be bent or extended in directions, such as a cone shape, to limit the amount of parallelism with the forces provided to the plug 100.

As will be understood, the blank provided may be a multi-sectional blank that may be unscrewed or decoupled from the interior of the frac plug 100, thus various geometries within the frac plug 100 are possible. The blank may be made from non-porous materials, such as steel, as a non-limiting embodiment. The blank may also be covered with a quick release agent to limit the amount of sticking of the placed glass and associated solutions, if applicable.

As will be also understood, placement of reinforcing glass fibers may be through a blowing process, wherein a simultaneous blowing of glass fibers occurs with a simultaneous spraying of resin. The amount of blown glass fibers may be measured compared to amount of resin sprayed such that an optimal amount of fibers to resin is achieved. Types of fibers to be incorporated into a resin maybe glass, carbon or Kevlar as non-limiting embodiments. Fibers may be in the form of veil mats, chopped strand mats or woven mats. Resin selection is performed based on fabric compatibility, as well as service conditions and desired characteristics of the finished part. Thermosetting resins may be made from epoxy and polyester, as non-limiting embodiments. In embodiments where a higher performance for structural integrity, epoxy may be used. Where cost of production is required to be low, a polyester resin may be used. Other embodiments that may be used include vinyl esters.

In one non-limiting embodiment, a method of production of a frac plug is disclosed comprising providing a blank defining an interior of the frac plug, placing a glass material around the blank such that a fiber reinforcement within the glass material is off axis to a longitudinal axis of the frac plug and wherein the placing forms a glass material blank, removing the blank from the glass material blank; and performing at least one mechanical processing of an exterior of the glass material blank.

In another non-limiting embodiment, the method may be performed wherein the frac plug has two components.

In another non-limiting embodiment, the method may be performed wherein at least one of the components is a separate mandrel configured to insert into a body.

In another non-limiting embodiment, the method may be performed wherein the glass is E glass.

In another non-limiting embodiment, the method may further comprise placing a rubber sealing ring adjacent to a lower element of the body.

In another non-limiting embodiment, the method may be performed wherein one of the placing of the glass material around the blank and the performing at least one mechanical processing of an exterior of the glass material blank forms at least two anchor slip assemblies.

In another non-limiting embodiment, the method may further comprise heating the glass material prior to placing the glass material around the blank.

In another non-limiting embodiment, the method may further comprise cooling a center of the glass material blank during placement.

In a still further embodiment, the method may be performed wherein the cooling of the center of the glass is through a fluid.

In another embodiment, the method may be performed wherein the fluid is an ethylene glycol solution.

In another embodiment, the method may be performed wherein the placing of the glass material includes winding the glass material around the blank.

In another embodiment, the method may be performed wherein the at least one mechanical processing is at least one of drilling a hole, mechanically abrading a surface of the glass material blank and filling a surface feature of the glass material blank.

In a still further embodiment, a method of production of a frac plug is disclosed, comprising providing a blank defining an interior of the frac plug, placing a glass material around the blank such that a fiber reinforcement within the glass material is off axis to a longitudinal axis of the frac plug and wherein the placing forms a glass material blank, placing a solution onto the placed glass material to produce a reaction between the glass material blank and the solution to form a resultant blank, removing the blank from the resultant blank, curing the resultant blank; and performing at least one mechanical processing of an exterior of the resultant blank.

In another embodiment, the method may be performed wherein the solution is a mixture of a resin, an alcohol and a hardener.

In another embodiment, the method may be performed wherein the placing of the solution is by at least one of a spraying, a dipping and a brushing.

In another embodiment, the method may be performed wherein the blank is made of a non-porous material.

In another embodiment, the method may be performed wherein the placing the glass material around the blank and the placing of the solution occur simultaneously.

In another embodiment, the method may further comprise cooling a center of the resultant blank during placement of the solution.

In another non-limiting embodiment, a method of production of a frac plug is disclosed comprising providing a blank defining an interior of the frac plug, placing a glass material around the blank such that a fiber reinforcement within the glass material is off axis to a longitudinal axis of the frac plug and wherein the placing forms a glass material blank and wherein the glass material has a resin pre added, placing a solution onto the placed glass material to produce a reaction with the glass material and the resin, removing the blank from the glass material blank, curing the glass material blank and performing at least one mechanical processing of an exterior of the glass material blank.

In another non-limiting embodiment, the method may further comprise heating the glass material prior to placing the glass material around the blank.

In one non-limiting embodiment, a method of production of a frac plug is provided, comprising providing a mold defining an interior of the frac plug, placing a glass material around the mold such that a fiber reinforcement within the glass material is off axis to a longitudinal axis of the frac plug and wherein the placing forms a glass material blank, removing the mold from the glass material blank, and performing at least one mechanical processing of an exterior of the glass material blank.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of production of a frac plug, comprising:
   providing a blank defining an interior of the frac plug;
   placing a glass material around the blank such that a fiber reinforcement within the glass material is off axis to a longitudinal axis of the frac plug and wherein the placing forms a glass material blank;
   removing the blank from the glass material blank; and
   performing at least one mechanical processing of an exterior of the glass material blank.

2. The method according to claim 1, further comprising heating the glass material prior to placing the glass material around the blank.

3. The method according to claim 2, further comprising cooling a center of the glass material blank during placement.

4. The method according to claim 3, wherein the cooling of the center of the glass is through a fluid.

5. The method according to claim 4, wherein the fluid is an ethylene glycol solution.

6. The method according to claim 1, wherein the frac plug has two components.

7. The method according to claim 6, wherein at least one of the components is a separate mandrel configured to insert into a body.

8. The method according to claim 1, wherein the glass material is E glass.

9. The method according to claim 1, further comprising:
   placing a rubber sealing ring adjacent to a lower element of a body of the glass material blank.

10. The method according to claim 1, wherein one of the placing of the glass material around the blank and the performing at least one mechanical processing of an exterior of the glass material blank forms at least two anchor slip assemblies.

11. The method according to claim 1, wherein the placing of the glass material includes winding the glass material around the blank.

12. The method according to claim 1, wherein the at least one mechanical processing is at least one of drilling a hole, mechanically abrading a surface of the glass material blank and filling a surface feature of the glass material blank.

13. A method of production of a frac plug, comprising:
providing a blank defining an interior of the frac plug;
placing a glass material around the blank such that a fiber reinforcement within the glass material is off axis to a longitudinal axis of the frac plug and wherein the placing forms a glass material blank;
placing a solution onto the placed glass material to produce a reaction between the glass material blank and the solution to form a resultant blank;
removing the blank from the resultant blank;
curing the resultant blank; and
performing at least one mechanical processing of an exterior of the resultant blank.

14. The method according to claim 13, wherein the solution is a mixture of a resin, an alcohol, and a hardener.

15. The method according to claim 13, wherein the placing of the solution is by at least one of a spraying, a dipping and a brushing.

16. The method according to claim 13, wherein the blank is made of a non-porous material.

17. The method according to claim 13, wherein the placing the glass material around the blank and the placing of the solution occur simultaneously.

18. The method according to claim 13, further comprising cooling a center of the resultant blank during placement of the solution.

19. A method of production of a frac plug, comprising:
providing a blank defining an interior of the frac plug;
placing a material around the blank such that a fiber reinforcement within the glass material is off axis to a longitudinal axis of the frac plug and wherein the placing forms a glass material blank and wherein the glass material has a resin pre added;
placing a solution onto the placed glass material to produce a reaction with the glass material and the resin;
removing the blank from the glass material blank;
curing the glass material blank; and
performing at least one mechanical processing of an exterior of the glass material blank.

20. The method according to claim 19, further comprising heating the glass material prior to placing the glass material around the blank.

21. A method of production of a frac plug, comprising:
providing a mold defining an interior of the frac plug;
placing a glass material around the mold such that a fiber reinforcement within the glass material is off axis to a longitudinal axis of the frac plug and wherein the placing forms a glass material blank;
removing the mold from the glass material blank; and
performing at least one mechanical processing of an exterior of the glass material blank.

* * * * *